United States Patent
Gabrys et al.

(10) Patent No.: US 6,798,092 B1
(45) Date of Patent: Sep. 28, 2004

(54) LOW OUTGAS FLYWHEEL MOTOR/GENERATOR

(76) Inventors: Christopher W. Gabrys, 900 S. Meadows Pkwy., #3513, Reno, NV (US) 69511; David R. Campbell, 6850 Sharlands Ave., #W1137, Reno, NV (US) 89523

(*) Notice: Subject to any disclaimer, the term of this patent is extended or adjusted under 35 U.S.C. 154(b) by 56 days.

(21) Appl. No.: 09/976,506

(22) Filed: Oct. 12, 2001

Related U.S. Application Data
(60) Provisional application No. 60/241,575, filed on Oct. 12, 2000.

(51) Int. Cl.[7] .............................................. H02K 15/12
(52) U.S. Cl. ............................ 310/45; 310/74; 310/43; 310/90.5
(58) Field of Search ............................. 310/45, 43, 74, 310/90.5, 254, 112–113, 104; 29/596–598; 74/572

(56) References Cited

U.S. PATENT DOCUMENTS

| | | | | |
|---|---|---|---|---|
| 4,933,581 A | * | 6/1990 | Shramo ........................ | 310/86 |
| 5,462,402 A | | 10/1995 | Bakholdin et al. ............ | 415/90 |
| 5,614,777 A | * | 3/1997 | Bitterly et al. ................ | 310/74 |
| 5,905,321 A | | 5/1999 | Clifton et al. ............... | 310/118 |
| 5,969,446 A | * | 10/1999 | Eisenhaure et al. ........... | 310/74 |
| 6,055,783 A | * | 5/2000 | Guhl et al. ............... | 52/204.62 |
| 6,236,127 B1 | * | 5/2001 | Bornemann ................... | 310/74 |
| 6,347,925 B1 | * | 2/2002 | Woodard et al. .............. | 417/51 |
| 6,429,552 B2 | * | 8/2002 | Asao et al. .................... | 310/64 |
| 6,570,286 B1 | * | 5/2003 | Gabrys ....................... | 310/90.5 |
| 6,630,761 B1 | * | 10/2003 | Gabrys ....................... | 310/90.5 |
| 6,664,680 B1 | * | 12/2003 | Gabrys ........................ | 310/74 |

OTHER PUBLICATIONS

"Outgassing from epoxy Resins and Methods for Its Reduction" Gupta et al., Sep. 04, 1976.
"Flywheel Engery Systems: Current Status and Future Prospects" Bowler, Sep. 22, 1997.
"Outgassing Measurements of Clad and Unclad Carbon Composite Laminates" Frink et al. 1992.
"Gassing and Dimensional Changes of Polymer Matrix Composites in Space" Tennyson et al. (exact date unknown, >1991).
"Composites In Space" NASA—Tennyson et al. May, 1991.

* cited by examiner

Primary Examiner—Tran Nguyen
Assistant Examiner—Leda Pham
(74) Attorney, Agent, or Firm—J. Michael Neary

(57) ABSTRACT

A flywheel energy storage system includes a housing adapted to be evacuated and maintained at a low pressure atmosphere, a cylindrical steel flywheel supported for low-loss rotation in the low pressure atmosphere within the housing on a bearing system, a nonevaporable getter for maintaining the low pressure atmosphere in the housing, and a motor/generator for accelerating and decelerating the flywheel for storing and retrieving energy. The motor/generator includes a rotor that is coupled to and rotates with the flywheel, and a stationary stator that cooperates with the rotor for converting between electrical and mechanical energy in the flywheel system and contains electromagnetic coils. The stator has a thin barrier coating for minimizing degradation of the low pressure atmosphere by minimizing outgassing from the stator into the housing.

18 Claims, 5 Drawing Sheets

LOW OUTGAS FLYWHEEL MOTOR/GENERATOR

This relates to U.S. Provisional Application No. 60/241,575 filed on Oct. 12, 2000. This invention pertains to flywheel energy storage systems and more particularly a low outgas motor/generator for use in flywheel systems using a getter to maintain the internal vacuum that increases the life of the getter material.

BACKGROUND OF THE INVENTION

Flywheels have been used for many years as energy storage devices. They have often been used as power smoothing mechanisms for internal combustion engines and other kinds of power equipment. More recently, flywheels have been recognized as a very attractive energy storage technology for such electrical applications as uninterruptible power supplies, utility load leveling systems, alternative energy generation, satellites and electric vehicles.

Modern flywheel energy storage systems convert back and forth between the rotational energy of a spinning flywheel and electrical energy. A flywheel energy storage system includes a flywheel, a motor and generator, a bearing system and usually a vacuum enclosure. The rotating flywheel stores the energy mechanically; the motor and generator converts between electrical and mechanical while the bearing system physically supports the rotating flywheel. High-speed flywheels are normally contained in a vacuum or low-pressure enclosure to minimize aerodynamic losses that would occur from operation in a gas at atmospheric pressure.

The vacuum surrounding a flywheel is usually maintained at a pressure of $10^{-1}$ Torr or lower to significantly reduce drag and the resulting potential overheating of the flywheel. Lower pressures are typically used for composite flywheels, which operate at higher tip speeds and have lower thermal conductivities. When composite flywheels are used, they outgas a large amount in vacuum due to the large volume of epoxy or polymer matrix material. Compared with composite flywheels, systems that employ steel flywheels outgas up to 1000 times less, making maintenance of the vacuum in the enclosure much easier. Despite the lower outgassing with use of a metal, or alternatively a specially constructed or treated composite flywheel, other components of the flywheel system then become the most significant outgas sources. The primary such source is the motor/generator of the flywheel system.

The motor/generator is necessarily constructed using polymer or other type electrical insulation materials that outgas appreciably in vacuum. These outgas sources can include insulation on the motor/generator coils, lamination insulation, epoxy potting and the trapped gasses between lamination surfaces if employed. Compared with a composite flywheel, the amount of these materials in the motor/generator is typically more than 1000 times less. Such a limited outgas source could be considered insignificant and in most cases can be easily pumped away. However, if a getter is used to maintain the vacuum in the flywheel system instead of a vacuum pump, this outgassing can be significant. Getters offer simpler operation and less maintenance than mechanical pumps. Unfortunately, they can only pump a limited amount of gas before becoming used up. Larger molecules such as hydrocarbons, which outgas from polymers, are also not very well sorbed by available getters. Motor/generators also get hot during charging and discharging of the flywheel system, and outgassing from a material is an exponential function of the temperature. Outgassing from the motor/generator can shorten the life of getter vacuum maintained flywheel systems or alternatively, it can require the use of more getter material, increasing costs.

SUMMARY OF THE INVENTION

The invention provides a low outgas motor/generator for use in flywheel energy storage systems that employ a nonevaporable getter to maintain the internal vacuum. It is particularly well suited for flywheel systems that use metal or steel flywheels. The flywheel systems in accordance with the invention have a low outgas barrier, typically a metal, on the stator portion of the motor/generator. The coating can cover the electromagnetic coils and their insulation and epoxy potting. It can also enclose any stator laminations, reducing outgassing from both the insulation materials and the gases trapped between laminations. The barrier can be a thin layer coating of metal that reduces the outgassing from the motor/generator stator. In one embodiment, the barrier is a foil such as aluminum or stainless steel foil that is bonded to the surface of the stator. The foil can be cut into pieces and bonded in sections to cover contoured surfaces if easier. In another embodiment, the stator is epoxy potted into the foil and the foil is used to line the potting mold. The use of a thin foil or sheet of metal layer enclosing some or part of the stator the does not cause appreciable losses due to eddy currents induced in the foil, and any heat generated in the foil is also thermally dissipated to the stator. The foil can be made very thin because outgassing is drastically reduced with very thin layers. Use of steel foils or other higher electrical resistivity materials reduces eddy currents and losses even more.

In another embodiment of the invention, the metal coating is applied to the stator by physical vapor deposition. This produces a much thinner layer of only several thousand Angstroms but still very effective and potentially less laborious. PVD can produce both metal coatings such as aluminum and also ceramic coatings. Either type that reduces the outgassing can be used with the invention however aluminum coatings are preferred for ease and low cost. In another embodiment of the invention, PVD can be conducted insitu inside the assembled and evacuated flywheel container. The metal is evaporated and deposited over the motor/generator as well as other components, which can include the flywheel. A shield is used to prevent coating of the nonevaporable getter material during physical vapor deposition.

In another embodiment of the invention, the barrier coating is applied by dipping brushing, spraying or wiping on a coating. A colloidal dispersion of low outgassing particles can be applied to the stator and baked for reduction of outgassing. A dispersion of fine graphite particles, sold under the name trade name Aquadag can be used. Tests on outgas reduction from coating polymers has shown that metal foil coatings reduce outgassing by a factor of 20, physical vapor deposited aluminum by a factor of 10 and carbon particle coating by a factor of 2–6. These outgas reductions can extend the life of the flywheel system and can reduce the amount of getter material required.

DESCRIPTION OF THE DRAWINGS

The invention and its many attendant benefits and advantages will become better understood upon reading the following detailed description of the preferred embodiment in conjunction with the drawings, wherein.

DESCRIPTION OF THE PREFERRED EMBODIMENT

Figure 1:
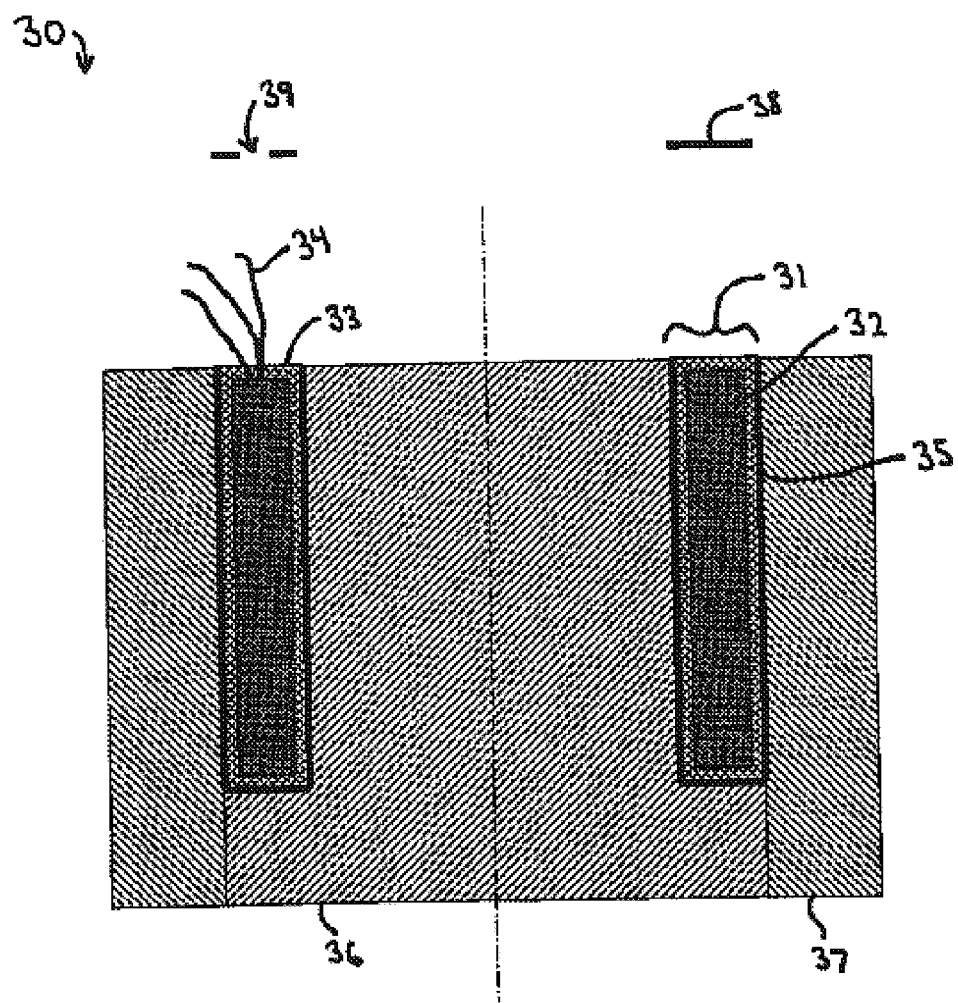
FIG. 1 is a schematic elevation of a production mold for making a low outgas stator for a flywheel motor/generator in accordance with the invention.

Turning to the drawings wherein like characters designate identical or corresponding parts, and more particularly to FIG. 1 thereof a low outgas stator for a flywheel motor/generator in accordance with the invention is shown during manufacturing. The stator 30 shown is an annular cylindrical air core type with electromagnetic coils 32 that are potted in a matrix 33 of epoxy or the like. Thermally conductive epoxy can be used to distribute and transfer heat from the coils 32. The potting is done using a two-piece mold 31 consisting of an outer ring 37 and inner portion 36. To reduce outgassing of the stator in the flywheel system vacuum, the stator epoxy is enclosed in a metal foil such as aluminum or steel foil. The foil is preferably thin, Fan approximately a couple of mils, to reduce eddy current losses and a lower electrical conductivity metal such as stainless steel can also be used. The foil can be bonded to the stator after assembly. Strips can be cut and bonded separately so that coverage over contours can be made. In another embodiment of the invention, the foil can be bonded on at the time of potting. This is illustrated in FIG. 1. The aluminum or stainless steel foil 35 is placed in the mold 31 prior to adding the epoxy 33 and the coils 32. The top of the stator 30 can be sealed at the same time or afterward if easier by applying a separate foil disc 38. Holes 39 should be provided in the disc 38 for exit of the wires 34 from the coils 32. The use of metal foil cladding has been found to reduce outgassing of epoxy by a factor of 20.

Figure 2:
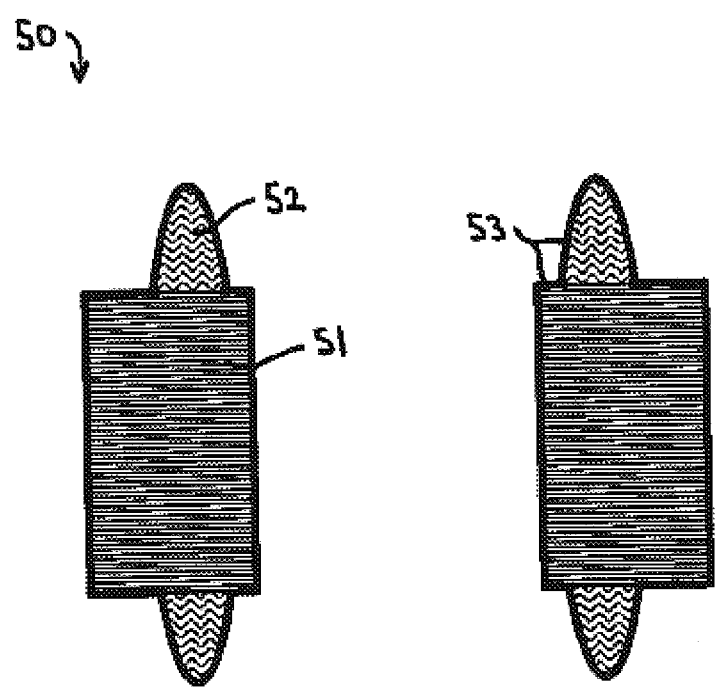
FIG. 2 is a schematic elevation of an alternate configuration low outgas stator for a flywheel motor/generator in accordance with the invention.

Some flywheel systems use air core stators and others use laminations with the coils depending on the power level and the particular design. A low outgas stator for a flywheel motor/generator using laminations in accordance with the invention is shown in FIG. 2. The stator 50 is an annular cylindrical construction having stacks of silicon steel laminations 51 and multiple electromagnetic coils 52. The coils 52 are typically vacuum impregnated with epoxy to improved heat transfer from the inner windings. The outgassing of the motor/generator is reduced by applying a low outgas barrier coating to the stator. Metal foil can be bonded in place or alternatively the stator can be metal coated by using electroplating or physical vapor deposition of a coating on the stator. To improve adhesion for physical vapor deposition, the stator is preferably coated with a thin layer of epoxy, about 1 mil works well. The stator is placed in a vacuum chamber and aluminum or another metal is evaporated inside and is deposited over the stator. The stator can be rotated and flipped to insure full coverage. Coatings of several thousand angstroms are preferred. The PVD can also produce ceramic coatings, which retard outgassing and these could be used instead on metal coatings. However, aluminum is preferable because of ease of application and low cost, and because it has a very low permeability for hydrogen which is readily outgassed by many materials.

After coated, the stator can be installed into a flywheel system or alternatively another thin coat of epoxy can be sprayed on top to improve the strength of the aluminum coating. The outer epoxy will outgass in vacuum but this layer is preferably very thin, about 1 mil, so its outgassing is very small. The stator can also be vacuum baked to release much of the gas from the outer epoxy layer if used. Metallized coatings, using aluminum, have been found to reduce outgassing from epoxy by a factor of 10. Use of a metal foil barrier or a continuous metalized coating to a stator of a motor/generator subjects the metal barrier to high frequency time varying magnetic fields, and because it is electrically conductive and continuous, eddy currents will be generated in the barrier coating causing heating and losses. However, because the barrier coating is very thin, this amount of power loss becomes very small. The second problem is that the power loss per amount of material is not necessarily small and potentially could cause excessive heating. But, because the foil or metal coating is bonded to the stator structure, heat generated in the thin foil is readily conducted away and diffused to the stator.

Besides using a metal foil or metal or ceramic PVD barrier coating, the stator could alternatively be barrier coated by applying a colloidal suspension of low outgas particles to the surface and then baking it to dry. One such suspension using fine graphite is marketed under the trade name Aquadag. The suspension can be brushed, wiped, sprayed or dipped on. A coating of Aquadag is not as effective as metal foil or PVD metalization, however it has been found to reduce outgassing of epoxy between a factor of 2–6 times. It is relative easy to apply though.

Figure 3:
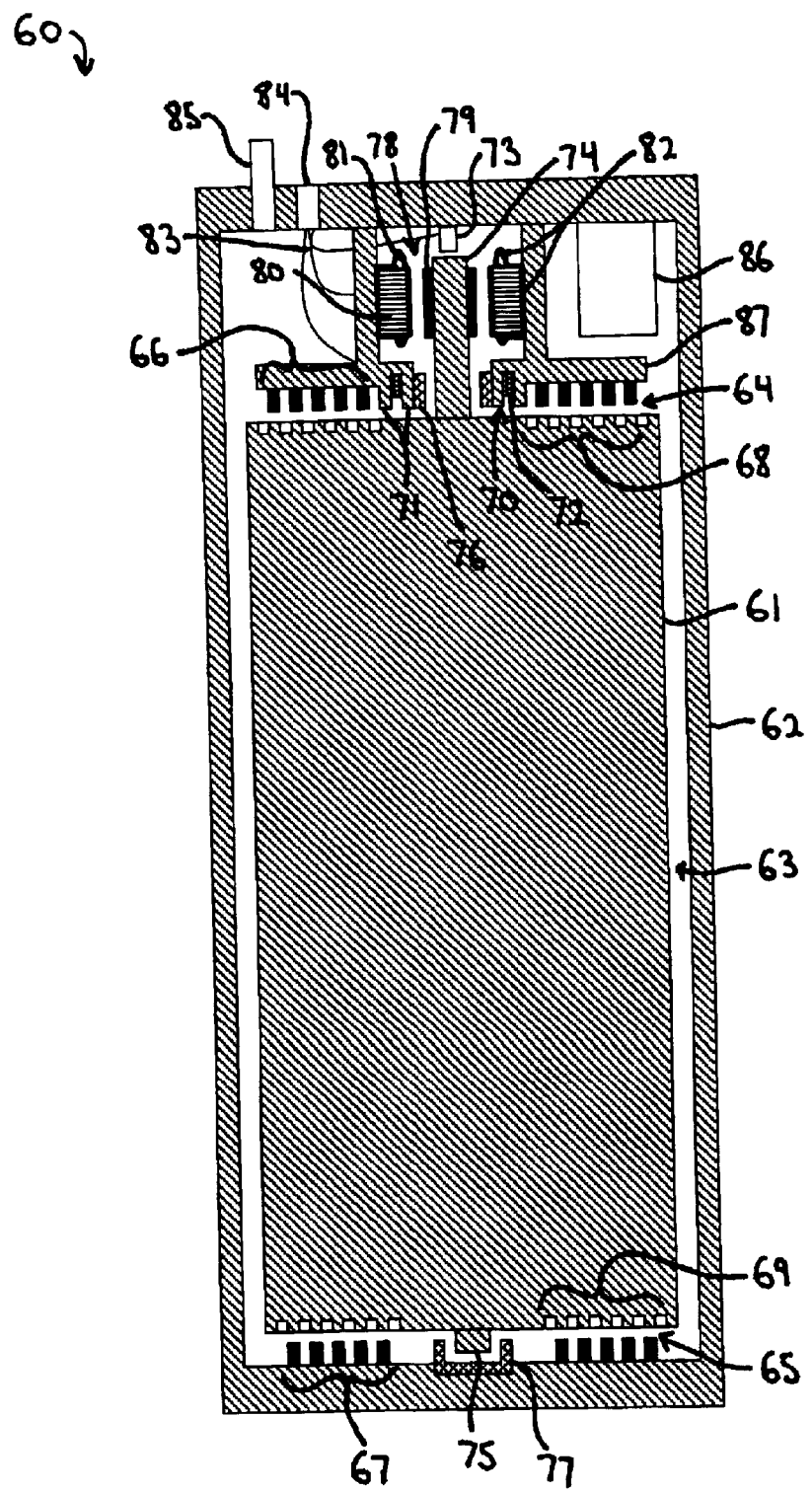
FIG. 3 is a schematic sectional elevation of a flywheel energy storage system with low outgas motor/generator in accordance with the invention.

A flywheel energy storage system with low outgas motor/generator in accordance with the invention is shown in FIG. 3. The flywheel system 60 is comprised of a solid steel flywheel 61 enclosed within an evacuated chamber 63 within a container 62. The flywheel 61 is supported for rotation using upper and lower magnetic bearings 64 and 65. The magnetic bearings 64, 65 provide lift of the weight of the flywheel 61 and passive radial centering. The magnetic bearings 64, 65 have concentric ring magnets 66 and 67 that are mounted stationary and cooperate with concentric poles 68 and 69 on the upper and lower ends of the flywheel 61. An active axial magnetic bearing 70 with axial steel poles 71 and an electromagnetic coil provide axial stability using an external circuit, not shown, and an axial position sensor 73 to provide feedback. When the active and passive magnetic bearings 70, 64, 65 are not operating, upper and lower mechanical bearings or bushings 76 and 77 support the flywheel 61 through upper and lower shafts 74 and 75. Many types of bearings systems have been employed for use with flywheels including mechanical, magnetic, combinations, etc. Each type could be used with the invention.

The steel flywheel 61 has up to 1000 times or more lower outgassing than a composite flywheel. Because of the low outgassing of the flywheel 61, other components inside the chamber 62 can become comparatively major outgassing sources. One such source is the motor/generator. The flywheel 61 is accelerated and decelerated for storing and retrieving energy with the motor/generator 78. The motor/generator 78 uses rotor magnets 79 attached to the flywheel shaft 74 to form the rotor portion. The stator surrounds the rotor magnets 79 and is comprised of laminations 80 and electromagnetic coils 81. During charging and discharging of the flywheel system 60, higher power is sent through the motor/generator 78. Higher power operation causes the motor/generator 78 to rise in temperature and this accelerates its outgassing. To reduce the outgassing of the motor/ generator 78, the stator laminations 80 and coils 81 are substantially enclosed in a low outgas barrier coating 82. The coating 82 in this case is applied by metalizing aluminum on the surface. Most flywheel systems combine the motor and generator into a single unit however the invention would also be applicable for systems in which they are separate. The motor, generator or preferably both would thus be coated with a low outgas coating prior to use.

The motor/generator and other wires 83 exit the chamber 63 through a vacuum feedthrough 84. A pumping port 85 is provided to pull the initial vacuum on the flywheel system 60 and is subsequently pinched off. To maintain the internal vacuum in the chamber 63, a nonevaporable getter pump 86 is used to sorb the outgassing inside the chamber 63. The getter pump 86 contains getter material, not shown, for sorbing gases. Getter material such as SAES Getters ST707 is preferred for low temperature activation and large capacity. These getter materials lose sorbing efficiency with larger molecules such as hydrocarbons, which outgass from polymers. However, because the polymer components of the motor/generator are mostly covered with metal, the outgassing is greatly reduced. The life of the flywheel system is extended or alternatively, the amount of getter material required is reduced. Other types of nonevaporable getters could also be applied. Nonevaporable getters are preferred over evaporable types because they have much larger capacities and do not continuously require power.

Figure 4:
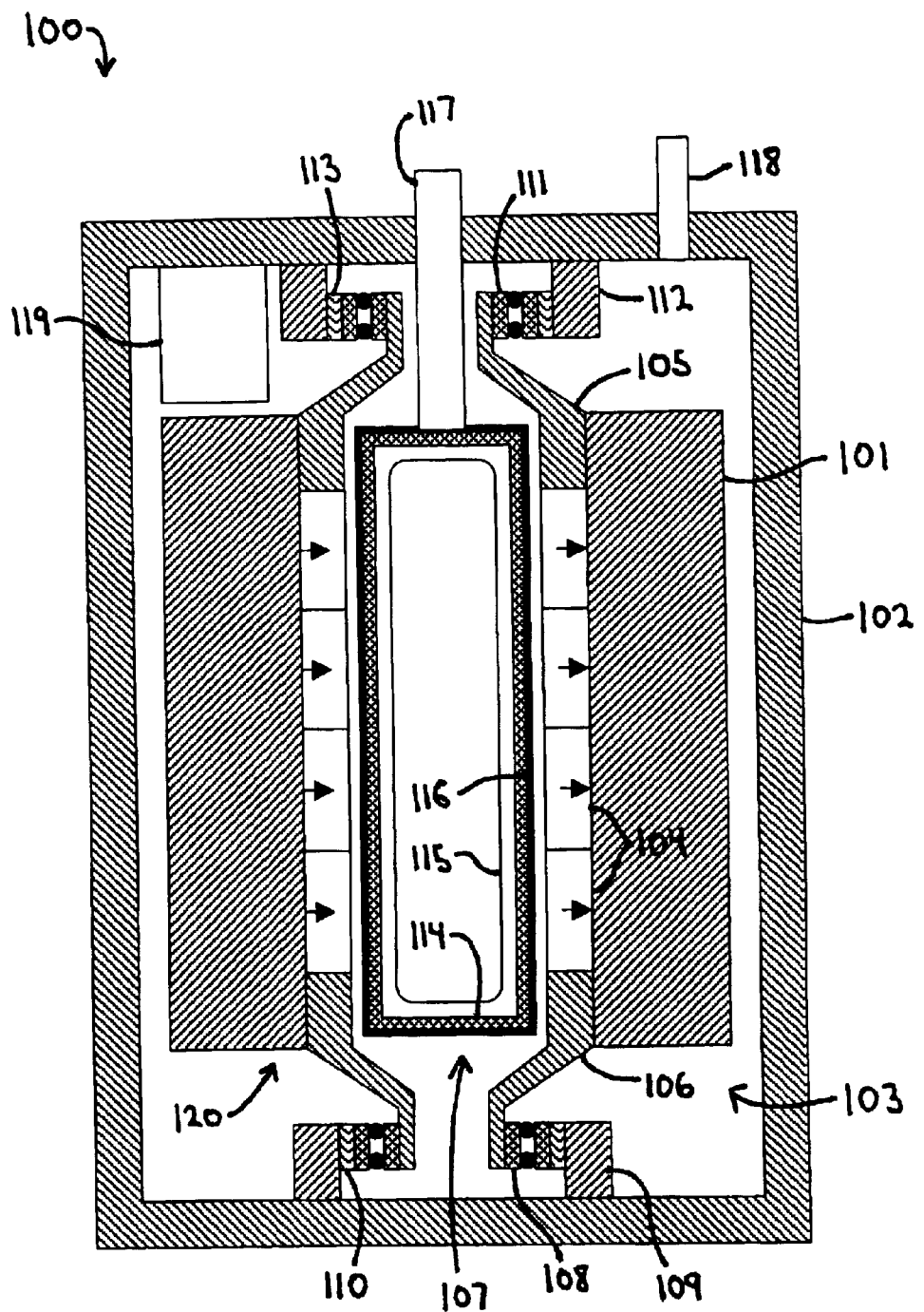
FIG. 4 is a schematic sectional elevation of an alternate flywheel energy storage system with low outgas motor/generator in accordance with the invention.

An alternate flywheel energy storage system with a low outgas motor/generator in accordance with the invention is shown in FIG. 4. The flywheel system 100 is comprised of an integrated tubular flywheel motor/generator 120. The flywheel is preferably a steel tube flywheel 101, however it is conceivable that a composite flywheel with a low outgassing resin or one that is coated to reduce outgassing could alternatively be used. The flywheel 101 is supported using upper and lower hubs 105 and 106. The flywheel 101 is housed inside a container 102 having an internal chamber 103 that is maintained at a vacuum or low pressure. The hubs 105 and 106 are journalled in upper and lower mechanical bearings 111 and 108 that are mounted to bearing mounts 112 and 109 using compliant mounts 113 and 110. Inside the flywheel 101 is a motor/generator 107. The motor/generator 107 includes an array of magnets 104 that are supported radially during rotation by the flywheel 101, and a stationary central stator 114. The stator 114 is constructed of a plastic or other nonconductive material. Inside the stator are electromagnetic coils 115 for converting between the electrical and mechanical energy. The stator is also filled with liquid, not shown, to cool the coils 115.

To reduce the outgassing from the stator, the stator is enclosed in a metal barrier coating 116. The barrier coating 116 is comprised of aluminum foil epoxy bonded around the stator outer diameter and on the upper and lower ends. A mounting tube 117 supports the stator and provides a vacuum-tight exit for the wires, not shown, of the stator coils 115. The vacuum 103 inside the chamber 102 is maintained by a nonevaporable getter 119.

Figure 5:
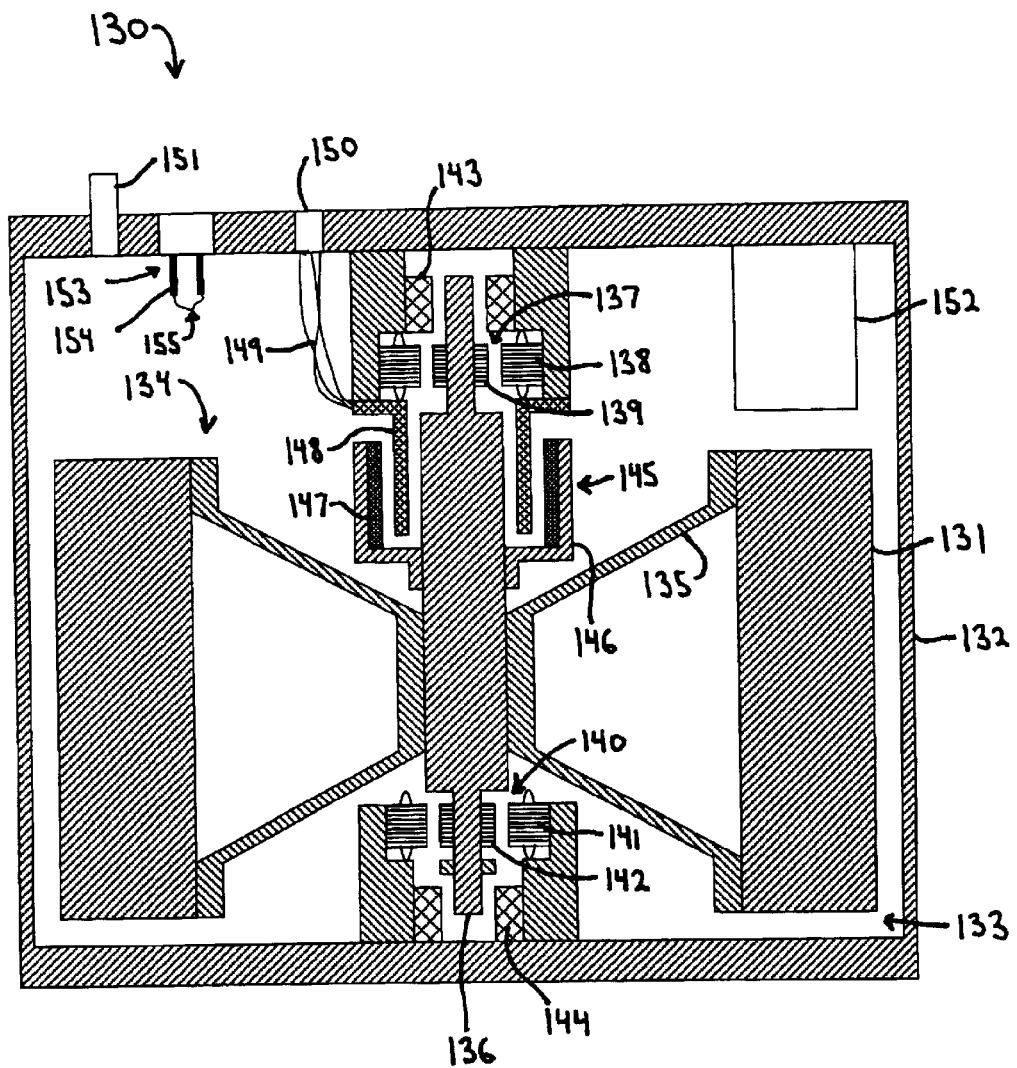
FIG. 5 is a schematic sectional elevation of a second alternate flywheel energy storage system with low outgas motor/generator in accordance with the invention.

A second alternate flywheel energy storage system with low outgas motor/generator in accordance with the invention is shown in FIG. 5. This configuration shows another embodiment of the invention where the barrier coating is applied to the motor/generator and other internal components after the assembly of the flywheel system. The flywheel system 130 is comprised of a rim flywheel 131 that is housed inside a container 132 having an internal chamber 133 maintained at a low pressure or vacuum. The flywheel can be constructed from steel or composite materials as will be described. The flywheel 131 is supported on a hub 135 connected to a central shaft 136. The flywheel is journaled using upper and lower active magnetic bearings 137 and 140. The magnetic bearings 137, 140 use laminated rotors 139, 142 connected to the shaft 136 that cooperate with magnetic bearing stators 138 and 141. The magnetic bearing stators 138, 141, surround the rotors 139,142 and are actively controlled to provide levitation. When the magnetic bearings 137, 140 are not operating, the shaft is supported by upper and lower auxiliary bearings or bushings 143 and 144.

The motor/generator 143 uses an air core design with an outer rotor cup 146 having internal magnets 147. The shaft 136 can be used to provide a magnetic return path with the cup 146. The stator 148 is located radially between the magnets 147 and the shaft 146. The stator is potted in thermally conductive epoxy and could be potted directly with a metal foil barrier. The motor/generator wires 149 and magnetic bearing wires, not shown, exit the container through a vacuum-tight electrical feedthrough 150. A pumping port 151 is used to pull the initial vacuum 133 and to allow sealing of the container 132 by pinching off. Other means of sealing could also be used.

In this configuration of flywheel system, another aspect of the invention is illustrated. The metal coating of the motor/generator as well as simultaneously other components such as the flywheel are coated insitu. The metal coating occurs after the flywheel system 130 is assembled and a vacuum is pulled. A physical vapor deposition unit 152 with two electrodes 154 and an aluminum or other metal strip 155 is located inside the chamber 132. Once the vacuum 133 is established, the material strip 155 is vaporized using an electric current through the electrodes 154. The vaporized metal then coats the internal components of the chamber 133 and the inner surface of the chamber. A composite flywheel could be used and coated by this insitu process. Multiple physical vapor deposition units 153 could also be used and placed at different locations to assure better coverage and the flywheel 131 could also be rotated in the process. Adhesion to rotating parts such as a flywheel can be a concern without an epoxy overcoating so a steel flywheel is still preferred. However, stationary parts such as the motor/generator and wires are easily coated to reduce their outgassing. A getter pump 152 is used to maintain the internal vacuum 133 after sealing the container 132. Care must be taken to prevent metal coating the nonevaporable getter material. The getter could be strategically placed in the chamber 132 or could have a mechanism, not shown, to expose the getter after the physical vapor deposition process was complete.

Obviously, numerous modifications and variations of the described preferred embodiment are possible and will occur to those skilled in the art in light of this disclosure of the invention. Accordingly, I intend that these modifications and variations, and the equivalents thereof, be included within the spirit and scope of the invention as defined in the following claims.

We claim:

1. A motor/generator for a flywheel energy storage system having a housing adapted to be evacuated and maintained at a low pressure atmosphere, a flywheel supported for low-loss rotation in said low pressure atmosphere within said housing on a bearing system, a nonevaporable getter for maintaining said low pressure atmosphere in said housing, and a motor/generator for accelerating and decelerating said flywheel for storing and retrieving energy, said motor/generator comprising:

a rotor that is coupled to and rotates with said flywheel;
  a stationary stator that cooperates with said rotor for converting between electrical and mechanical energy in said flywheel system and contains electromagnetic coils;

wherein said stator has a thin barrier coating for minimizing degradation of said low pressure atmosphere by minimizing outgassing from said stator into said housing.

2. A motor/generator for a flywheel energy storage system as described in claim 1, wherein:

said flywheel is constructed principally of steel.

3. A motor/generator for a flywheel energy storage system as described in claim 2, wherein:

said barrier coating is a metal.

4. A motor/generator for a flywheel energy storage system as described in claim 2 wherein:

said electromagnetic coils are substantially enclosed in said barrier coating.

5. A motor/generator for a flywheel energy storage system as described in claim 4, wherein:

said motor/generator stator has a laminated core; and said barrier coating covers vacuum exposed surfaces of all laminations in said motor/generator core.

6. A motor/generator for a flywheel energy storage system as described in claim 2, wherein:

said motor/generator has a separate motor and a separate generator.

7. A motor/generator for a flywheel energy storage system as described in claim 2, wherein:

said metal barrier coating is constructed of metal foil.

8. A motor/generator for a flywheel energy storage system as described in claim 7, wherein:

said foil is bonded to said stator after manufacture.

9. A motor/generator for a flywheel energy storage system as described in claim 7, wherein:

said foil is bonded to said stator during manufacture by potting said stator with a bonding agent inside said foil.

10. A motor/generator for a flywheel energy storage system as described in claim 2, wherein:

said stator is enclosed in a nonmetallic container that holds a cooling liquid and said nonmetallic container is coated with a barrier coating.

11. A motor/generator for a flywheel energy storage system as described in claim 1, wherein:

said barrier coating is applied by physical vapor deposition.

12. A motor/generator for a flywheel energy storage system as described in claim 10, wherein:

said barrier coating is a metal.

13. A motor/generator for a flywheel energy storage system as described in claim 10, wherein:

said barrier coating is a ceramic.

14. A motor/generator for a flywheel energy storage system as described in claim 1, wherein:

said barrier coating is applied by a process selected from the group consisting of dipping, wiping, spraying and brushing.

15. A motor/generator for a flywheel energy storage system as described in claim 1, wherein:

said barrier coating is in the form of a colloidal suspension of particles prior to application.

16. A motor/generator for a flywheel energy storage system as described in claim 15, wherein:

said particles in said colloidal suspension of particles are carbon particles.

17. In a flywheel energy storage system made of components assembled inside an evacuated chamber, said components including a motor and generator having insulated electrical windings, an improvement comprising:

a barrier coating on said insulated electrical windings to reduce outgassing from said insulated electrical windings, said barrier coating including a deposit of a vaporized metal inside said chamber on said electrical windings of said flywheel system.

18. A flywheel system as described in claim 17 wherein:

said barrier coating has a thickness between 1000 Angstroms and 10 mils.

* * * * *